United States Patent [19]

Bennett, Jr. et al.

[11] 4,205,797

[45] Jun. 3, 1980

[54] MAGNETIC CLEARANCE SENSOR

[75] Inventors: Clarence L. Bennett, Jr., Groton; Hugh C. Maguire, Westford, both of Mass.

[73] Assignee: Sperry Corporation, New York, N.Y.

[21] Appl. No.: 955,855

[22] Filed: Oct. 30, 1978

[51] Int. Cl.² ............................................. B02C 25/00
[52] U.S. Cl. ...................................... 241/222; 241/37; 324/208; 340/679
[58] Field of Search ................. 241/37, 222; 324/207, 324/208, 228; 340/551, 686, 545, 684, 540, 679

[56] References Cited

U.S. PATENT DOCUMENTS

| | | | |
|---|---|---|---|
| 2,548,599 | 4/1951 | Garr | 241/37 |
| 2,829,692 | 4/1958 | Innocenti | 241/37 X |
| 3,035,782 | 5/1962 | Burbank | 241/37 X |
| 3,133,707 | 5/1964 | Zimmerman | 241/37 |
| 3,434,670 | 3/1969 | May | 241/37 |
| 3,500,179 | 3/1970 | May | 241/37 X |
| 3,757,501 | 9/1973 | Bennett, Jr. et al. | 340/679 X |
| 3,815,111 | 6/1974 | Abbe | 340/686 |
| 3,855,525 | 12/1974 | Bernin | 324/208 |
| 3,912,434 | 10/1975 | Nagahara et al. | 241/37 X |
| 3,944,146 | 3/1976 | Stockmann et al. | 241/37 X |
| 4,045,738 | 8/1977 | Buzzell | 324/208 X |
| 4,084,752 | 4/1978 | Hagiwara et al. | 241/37 X |

*Primary Examiner*—Mark Rosenbaum
*Attorney, Agent, or Firm*—Howard P. Terry

[57] ABSTRACT

Magnetic-electronic apparatus for sensing the clearance between two ferrous metals, for application in measuring the clearance between a shear bar and the cutting knives of a harvesting farm machine, is disclosed having a magnetic sensor disposed within the shear bar for producing a magnetic field, the interception of which by the passage of a knife produces an electronic signal which is processed by appropriate circuitry for indicating the clearance between the knives and the shear bar.

6 Claims, 6 Drawing Figures

MAGNETIC CLEARANCE SENSOR

BACKGROUND OF THE INVENTION

1. Field of the Invention

The invention pertains to farm machinery and, more particularly, to means for detecting the clearance between two proximal ferrous elements in relative motion.

2. Description of the Prior Art

In some machines, the clearance between certain elements in relative motion may greatly affect the operation and efficiency of the machine. For example, in farm machinery, such as a forage harvester, the clearance between the cutter head knives and its associated shear bar may substantially affect the amount of fuel used in the operation thereof and also affect the food quality of the forage therefrom. A forage harvester is a farm machine that picks up crop or forage from the field and chops it into small pieces to enhance the food quality and the storage characteristics thereof. The chopping action takes place in the machine by means of a cutter head, having a plurality of knives mounted on its external perimeter rotating past a fixed shear bar, between which the crop or forage is conveyed. Thus, the clearance between the knives and the shear bar will readily affect the type of cut of the forage, for example, if the clearance between the knives and the shear bar is too large, a bad cut of the crop will occur reducing the food quality of the forage and increasing significantly the energy required. Accordingly, a minimum clearance, preferably as near zero as practical, is preferred. However, due to the fact that both the cutter knives and shear bar wear with use and with sharpening of the knives variations of the clearance of several thousandths of an inch are possible from knife to knife and from one end to the other end of any particular knife. It is apparent, that during operation the clearance of the knives may substantially increase, affecting the operation at its most inopportune time. In order to correct the situation, the operator must stop the operation of the machine, open the housing enclosing the cutter head and shear bar and if desired and practical, the operator may manually measure the clearance, for example, by means of a feeler gauge. This procedure is not only tedious and time consuming, but also inefficient and potentially dangerous. Furthermore, many forage harvesters do not provide easy access for manual measurement with a feeler gauge and, therefore, because of the time required for this procedure, fine tune adjustments of the clearance between the knives and the shear bar are neglected and an average clearance is generally provided for. Such an average clearance is, naturally, far from the optimum.

Accordingly, there is a need to provide efficient and rapid means for determining the clearance between elements in relative motion without requiring manual access thereto and shutdown of the machine and which may be utilized during the actual intended operation of the elements.

SUMMARY OF THE INVENTION

In accordance with the invention, apparatus for sensing the clearance between proximal elements in relative motion is provided and the clearance may be read on a remote, calibrated sensor meter. Furthermore, the apparatus is insensitive to moisture and crop material.

Specifically, the apparatus for sensing the clearance between the proximal elements includes magnetic field generating means cooperating with one of said elements and means for providing a signal indicative of the clearance. The magnetic field emanating from the generating means is intercepted by the proximal element in relative motion with said one of said elements, providing a signal indicative thereof. The apparatus further includes circuit means responsive to said signal for providing a clearance signal indicative of the clearance between the proximal element and the shear bar, which may be read on an appropriately calibrated meter.

More specifically, the magnetic field generating means includes a magnet coupled to a plurality of soft iron pole pieces, forming a portion of the shear bar proximal element, for developing a magnetic field emanating from one pole piece and terminating on the other pole piece and directed outwardly toward the other proximal element, cutter head knives, whose clearance therefrom is to be measured. The circuit means for providing the clearance signal includes a sensor coil about one of said pole pieces for sensing the signal produced by the interception of the magnetic field by the other proximal element and circuit processing means including a pulse shaper, peak detector, divider and multipler for providing the clearance signal to appropriate utilization means.

DESCRIPTION OF THE PREFERRED EMBODIMENTS

Figure 1:
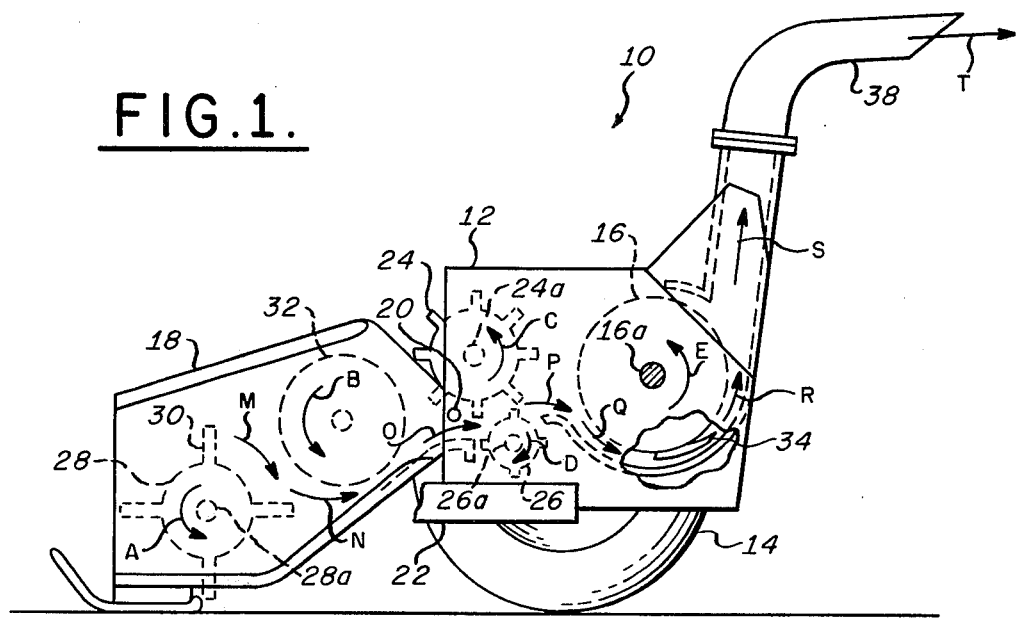
FIG. 1 is a fragmentary elevation view, partly in cross-section, of a forage harvesting machine illustrating one application of this invention.

Attention is directed to FIG. 1 which illustrates a forage harvesting machine 10 in which the present invention may be advantageously utilized. The forage harvester 10 includes a wheel mounted frame or housing 12 mounted on wheels 14 (only one being shown for clarity) for supporting a forage cutter head 16, and in this example, a crop pick up unit 18. The crop pick up unit 18 is pivotally mounted at 20 for support in part from the basic frame work 22 by which the harvester may be towed by a suitable tractor (not shown). The harvester further includes at least one set of in-feed conveyor rolls 24 and 26, mounted for rotation about substantially parallel axes 24a and 26a and journalled in the housing 12. The forage cutter head assembly 16 is mounted within the housing 12 to the rear of the conveyor rolls 24 and 26 for rotation on shaft 16a and for receiving forage ejected from the conveyor rolls 24 and 26. A discharge spout 38 extends vertically and then horizontally from the rearward portion of the housing 12.

The crop pick up unit 18 comprises a conventional rotatable reel 28 on a shaft 28a having a plurality of radially projecting, laterally spaced pick up tines or fingers 30. The tines 30 cooperate with a plurality of conventional laterally spaced stripping or doffing members (not shown) to lift the crop into the influence of a conventional rotatable auger 32, which directs the crop material into the input of the in-feed conveyor rolls 24 and 26. From the conveyor rolls 24, 26, the crop material is metered in a mat-like form to the cutter head 16, where it is comminuted by a rotating array of knives 34 attached to the periphery of the cutter head, which cooperate with a fixed shear bar 36, more clearly shown in FIG. 2, and is finally discharged through the discharge spout 38 into a suitable receptacle, such as a truck or wagon (not shown). It is apparent that the forage harvester 10 of FIG. 1 has been simplified for clarity; however, the associated drive belts, other drive means and means for connection thereof to the power source are fully described in U.S. Pat. No. 3,523,411, issued to T. W. Waldrop et al on Aug. 11, 1970 and assigned to the present assignee. When operated in such fashion, the flow of crop material is over the reel 28 into the auger 32, into the rolls 24 and 26, into the cutter head 16 and finally out spout 38. The rotation of the above-mentioned elements is indicated by arcuate arrows A, B, C, D and E and the flow of crop material is indicated by arrows M through T, inclusive.

In traversing path P to Q, the forage material flows between the cutter head 16 or the knives 34 thereof and the shear bar 36 where it is chopped by the rotation of the knives relative to the fixed shear bar into a desired length as determined by, for example, the number of knives and the spacing thereof on the cutter head 16. As indicated above, the clearance between the cutter head knives 34 and the shear bar 36 is desirably zero or as close thereto as is possible to practice efficiently such that a sharp energy efficient cut is obtained, to preserve the food quality of the forage material and to maintain the energy level required to perform the cutting.

Figure 2:
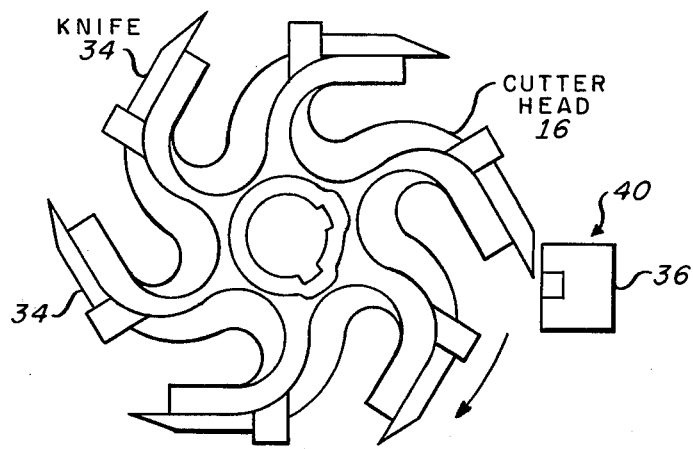
FIG. 2 is a view of the cutter head of the forage harvesting machine of FIG. 1 and the associated shear bar incorporating a portion of the invention.
Figure 3:
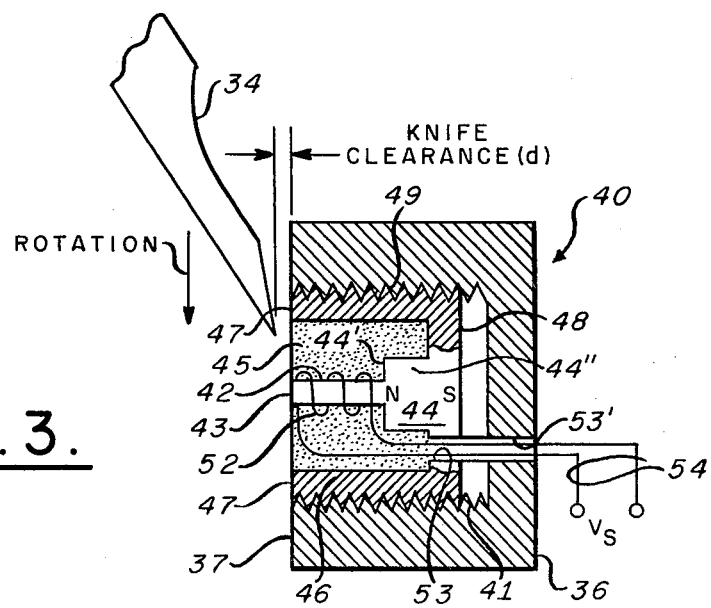
FIG. 3 is a cross-sectional view of a portion of the invention illustrated in relation to a knife of the cutter head.
Figure 4:
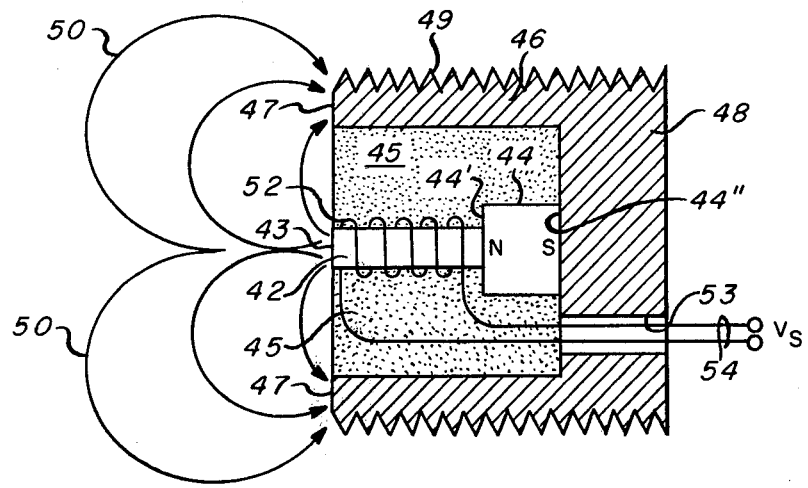
FIG. 4 is an expanded view of the portion of the invention illustrated in FIG. 3 showing the magnetic field lines associated therewith.

As shown in FIG. 2, the apparatus of this invention includes magnetic field generating means or assembly 40 coupled to and forming a part of the shear bar 36. Although the magnetic generating means 40 may utilize an excitation coil, a permanent magnet is disclosed herein as it is less expensive and more reliable. Referring now to FIG. 3, the magnetic generating means 40 of this invention is disclosed disposed within a cavity 41 of the shear bar 36 for cooperation with the shear bar and forming a face portion 37 thereof in relative motion to the knives 34 of the cutter head 16 between which the knife clearance (d) is measured. The preferred embodiment of the magnetic field generating means 40 of FIG. 3 includes a soft iron cylindrical pole piece 42 coupled to one pole (N or S) 44′ of a permanent magnet 44. The pole piece 42, moreover, may form a portion of the permanent magnet 44 having a pole (N or S) disposed at the end 43 of the pole piece 42. The pole piece 42 and the permanent magnet 44 are disposed within a soft iron housing 46 having a cup-shaped or annular one end closed formation. The other pole portion 44″ of the magnet 44 is coupled to the internal rear closed end wall 48 of the cup-shaped housing 46. The pole piece 42, disposed within the housing 46 extends outwardly from the rear wall 48 thereof forming an annulus 45, and the end 43 thereof terminates substantially in the plane formed by the peripheral ends or pole 47 of the housing 46, thus forming a part of the face portion 37 of the shear bar 36. The assembly 40 and the shear bar 36 further include means 49 (shown here as matching screw threads) for mounting the assembly 40 within the cavity 41, as shown in FIG. 3. The magnetic field generating means 40 produces a magnetic field 50 as shown in FIG. 4, between the pole piece 42 and the pole 47 of the housing 46 which is advantageously used herein. It is noted that in order to prevent material from accumulating in the annulus 45 formed between the pole piece 42 and the housing 46, and, also to provide structural integrity to the pole piece 42, the cavity may be filled with a non-magnetic filler material.

The apparatus of the invention further includes a sensor coil 52 of N turns wrapped about the pole piece 42 having leads 54 extending therefrom. In this preferred embodiment of the invention, the leads extend through a passageway 53 formed within the housing rear wall 48 and outwardly from the shear bar through a passageway 53′ formed therein. The leads are coupled to circuit means 55 for providing a signal thereto in response to the passage of each of the knives 34 through the magnetic field 50 such that the clearance (d) may be determined. Accordingly, as the knife 34 intercepts the magnetic field 50 of the assembly 40, the magnetic flux Φ through the pole piece 42 increases in response to the decreased magnetic reluctance resulting from the presence of the ferrous element, the knife 34. It is known, moreover, that for small distances, that is, for small clearances (d) between the knife 34 and the magnetic generating means 40, the magnetic flux is approximately inversely proportional to the distance, i.e., $$\Phi \alpha \frac{1}{d} \qquad (1)$$

Furthermore, if the ferrous element or the knife 34 is moved relative to the magnetic generating means 40 and the sensor coil 52, a voltage is sensed by the coil which is expressed as:

$$V_s(t) = N \frac{d\phi}{dt} \qquad (2)$$

Figure 5:
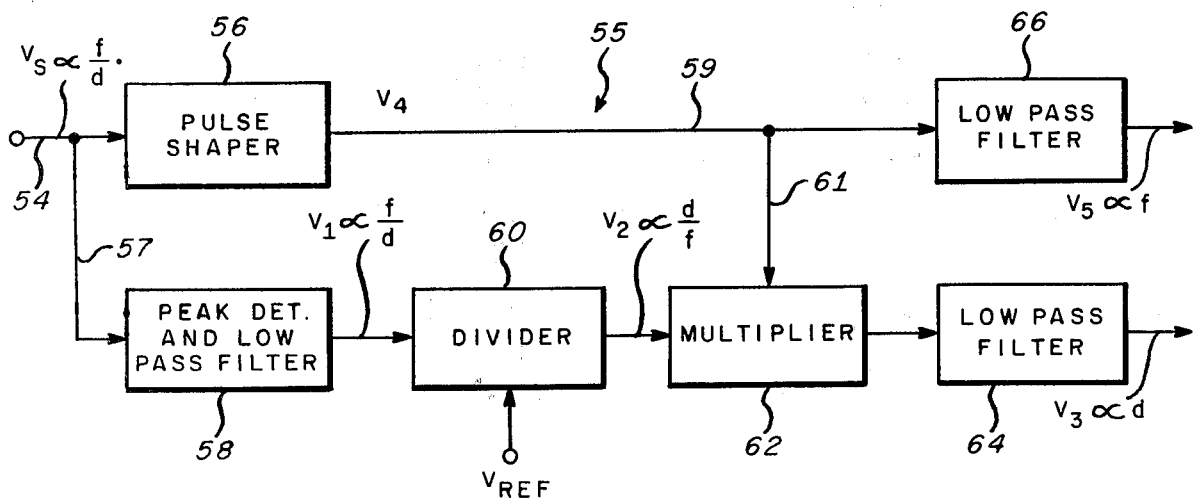
FIGS. 5 and 6 are circuit diagrams of the invention.

Referring now to FIG. 5 and the circuit means 55 thereof, the sensed signal Vs is proportional to the frequency (f) at which the knives 34 rotate past the magnetic field generating means 40 and inversely proportional to the clearance thus $$V_s \alpha \frac{f}{d} \qquad (3)$$

The sensed signal is coupled via leads 54 to the circuit means 55 and, more specifically, to a pulse shaper means 56 and to a peak detector and low pass filter means 58 via a branching lead 57. The output of the peak detector and low pass filter means 58 is coupled to a divider means 60 having a reference voltage ($V_{REF}$) supplied thereto from which the output, now proportional to d/f, is coupled to a multipler means 62. The multipler also receives an input from the pulse shaper 56, via lead 59 and branching lead 61. The output from the multipler is coupled to a low pass filter 64 wherein the output therefrom may be connected to suitable utilization means (not shown) as the output from the low pass filter 64 is directly proportional to the clearance (d) to be measured. It is noted that the output of the pulse shaper may be coupled to a low pass filter 66 to produce a d.c. voltage proportional to the knife frequency (f). A suitable utilization means, such as a voltmeter properly scaled, could be coupled thereto to indicate the rate of cutter head rotation.

Figure 6:
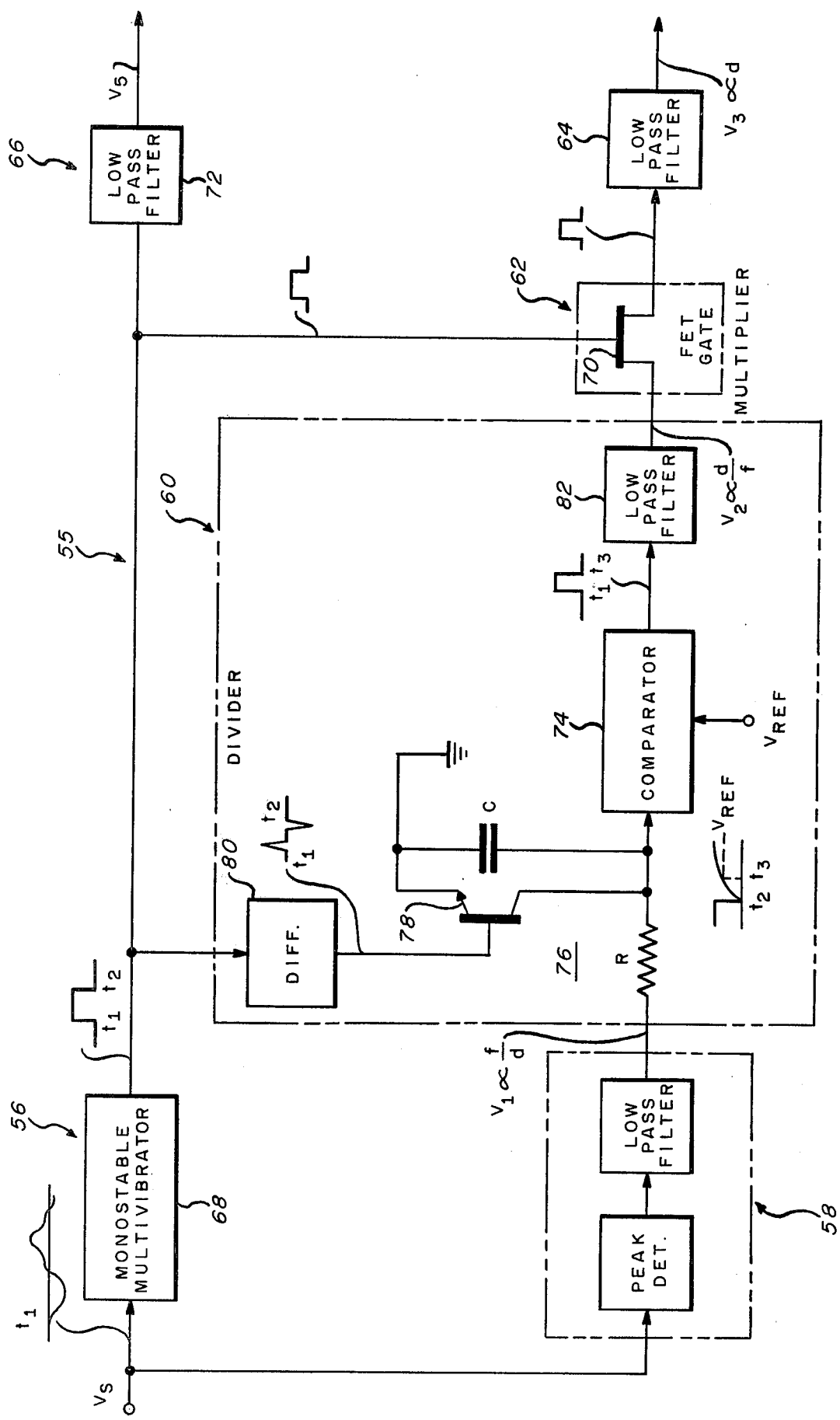

The circuit 55 is schematically illustrated in FIG. 6 and includes representative wave shapes for explanation purposes. The pulse shaper 56 of FIG. 5 is shown as a monostable multivibrator 68 having a period less than the period to be sensed and the multipler 62 is illustrated as an FET gate 70. Furthermore, the divider 60 includes a comparator 74 coupled to the peak detector and low pass filter 58 through an RC network 76. One terminal of the resistor R is coupled to the peak detector and low pass filter means 58 and the other terminal is coupled to the comparator 74. The capacitor C is coupled to said other terminal of the resistor R and to ground and is responsive to a switch, a transistor 78. The transistor 78 has its collector coupled to the resistor capacitor terminal connection and its emitter coupled to the capacitor terminal coupled to ground. The base terminal of the transistor 78 is coupled to a differentiator 80 having its input coupled to the output of the monostable multivibrator 68. The comparator 74 is coupled to the reference voltage $V_{REF}$ and its output is connected to the multipler 62, FET gate 70, through a low pass filter 82.

In operation, the sensed signal Vs is coupled to the monostable multivibrator 68 and the peak detector and low pass filter means 58. At time $t_1$, the beginning of the sensor signal Vs, the monostable multivibrator 68 turns on and stays on until $t_2$, where $(t_2-t_1)$ is a constant value less than the time between successive knives 34 passing the shear bar 36, producing a pulse signal as shown in FIG. 6. As the multivibrator 68 turns on at time $t_1$, the output of the differentiator 80 produces a positive pulse, see FIG. 6, that turns on transistor 78 and rapidly discharges the capacitor C to ground or zero potential. Furthermore, the comparator 74 is turned on at $t_1$ as its input voltage is below $V_{REF}$. After time $t_1$, as the differentiator 80 output is zero and, thus, the transistor 78 is off, the capacitor C begins to charge in response to the voltage $V_1$, the output of the peak detector and low pass filter means 58, which is proportional to f/d. The slope of the charging waveform on the capacitor C is proportional to $V_1$. As the value of the charging waveform crosses $V_{REF}$ at time $t_3$, the comparator 74 turns off producing a pulse waveform whose duration is inversely proportional to f/d, which when passed through the low pass filter 82 produces the d.c. voltage $V_2$ that is proportional to d/f. The d.c. voltage $V_2$ is gated by the output of the monostable multivibrator 68 which is a rectangular pulse waveform whose repetition rate is proportional to frequency. The output of the FET gate 70 is passed through the low pass filter 64 resulting in the d.c. voltage output $V_3$, proportional to the knife clearance d, which may be coupled to appropriate utilization means.

Accordingly, the preferred embodiment of the invention as disclosed herein may be utilized to obtain accurate clearance settings, for example in a forage harvester cutter head, while the machine is operating in its intended environment under power and, monitoring of the knife clearance of a forage harvester may be readily and efficiently accomplished during actual harvesting by means which obviate the need for access to the knife-shear bar area and which allow the optimum clearance to be readily updated such that the fuel required for harvesting, cutting, is reduced while the quality of the forage is increased. Further, the apparatus of this invention is insensitive to moisture and crop material. It has been observed that in operation with a forage harvester, the pole piece 42 may be subjected to substantial wear by the action of the forage material such that significant inaccuracies arise in the measurement. Accordingly, a magnetically transparent, wear resistant material, e.g., a stainless steel cover plate, may be disposed across the end 43 of the pole piece, flush with the shear bar, to prevent the wear of the pole piece and the associated inaccuracies.

While the invention has been described in its preferred embodiments, it is to be understood that the words which have been used are words of description rather than limitation and that changes within the purview of the appended claims may be made without departing from the true scope and spirit of the invention in its broader aspects

We claim:

1. Apparatus for providing a clearance signal proportional to the clearance between opposing portions of proximal ferrous elements in relative motion comprising:

magnetic field generating means able to cooperate with one of said proximal ferrous elements to form a portion thereof and generate a magnetic field emanating from the generating means and outwardly from the opposing portion of said one of said proximal ferrous elements to be intercepted by said other ferrous element for providing an intercept signal, said intercept signal having a frequency proportional to the frequency at which said other ferrous element intercepts the magnetic field emanating from the generating means, magnetic field responsive means cooperating with said field generating means and responsive to said intercept signal, said magnetic field responsive means includes detector means responsive to said intercept signal for providing a signal having an amplitude inversely proportional to the clearance, divider means coupled to the detector means for dividing the signal therefrom and providing an output signal inversely proportional thereto, pulse shaper means responsive to said intercept signal for providing a signal whose repetition rate is proportional to the frequency of the intercept signal, and multiplier means coupled to said divider means and said pulse shaper means for multiplying the output signal from the divider means by the signal from the pulse shaper means for providing the clearance signal.

2. Apparatus for providing the clearance signal according to claim 1 wherein said pulse shaper means comprises a monostable multivibrator.

3. Apparatus for providing the clearance signal according to claim 2 wherein said divider means includes a differentiator coupled to said monostable multivibrator, an RC network, the RC network including a capacitor having one terminal coupled to ground, a comparator coupled to the detector means through the RC network and a switch coupled between the differentiator and the RC network, whereby the output of the comparator is inversely proportional to the input from the detector means and is coupled to the multiplier means.

4. Apparatus for sensing the clearance between opposing portions of proximal elements according to claims 1 or 3 wherein the magnetic field responsive means includes a coil disposed about a portion of the magnetic field generating means.

5. Apparatus for sensing the clearance between opposing portions of proximal elements according to claims 1 or 3 wherein the magnetic field generating means includes a housing having a plurality of magnetic pole portions directed outwardly from said opposing portion of said one of said elements and forming a portion of the surface of said element, the housing further including a permanent magnet for providing said magnetic field directed from one of said pole portions to the remainder of said pole portions.

6. In combination with a forage harvester having a cutter head, including a plurality of knives thereon, and a shear bar, apparatus for providing a clearance signal proportional to the clearance between a knife and the shear bar comprising:

magnetic field generating means cooperating with the shear bar forming a face portion thereof and generating a magnetic field emanating from the generating means and outwardly therefrom to be intercepted by said knife in relative motion with the shear bar for providing an intercept signal, said intercept signal having a frequency proportional to the frequency at which said other ferrous element intercepts the magnetic field emanating from the generating means, magnetic field responsive means cooperating with said field generating means and responsive to said intercept signal, said magnetic field responsive means includes detector means responsive to said intercept signal for providing a signal having an amplitude inversely proportional to the clearance, divider means coupled to the detector means for dividing the signal therefrom and providing an output signal inversely proportional thereto, pulse shaper means responsive to said intercept signal for providing a signal whose repetition rate is proportional to the frequency of the intercept signal, and multiplier means coupled to said divider means and said pulse shaper means for multiplying the output signal from the divider means by the signal from the pulse shaper means for providing the clearance signal.

* * * * *